United States Patent [19]

Reboullet

[11] Patent Number: 4,819,002

[45] Date of Patent: Apr. 4, 1989

[54] DEVICE FOR ORIENTING AND ANGULARLY POSITIONING THE AXIS OF ROTATION OF A ROTATABLE LOAD

[75] Inventor: Marc J. Reboullet, Meudon, France

[73] Assignee: Societe Nationale d'Etude et de Construction de Moteurs d'Aviation "S.N.E.C.M.A.", Paris, France

[21] Appl. No.: 913,375

[22] Filed: Sep. 30, 1986

[30] Foreign Application Priority Data

Oct. 2, 1985 [FR] France ................. 85 14580

[51] Int. Cl.$^4$ .......... H01Q 3/10; H01Q 1/12; H01Q 1/18; H01Q 3/02

[52] U.S. Cl. ............. 343/765; 343/882; 74/469; 248/179; 901/28

[58] Field of Search ......... 343/757, 759, 765, 766, 343/878, 880, 882; 74/469; 248/179, 183, 186, 371; 901/28, 29

[56] References Cited

U.S. PATENT DOCUMENTS

| 3,407,404 | 10/1968 | Cook et al. | 343/765 |
| 3,665,482 | 5/1972 | Cresswell | 343/765 |
| 4,181,283 | 1/1980 | Rizzo | 343/765 |
| 4,575,039 | 3/1986 | Persson et al. | 248/179 |
| 4,617,572 | 10/1986 | Hugo | 343/765 |

FOREIGN PATENT DOCUMENTS

| 155922 | 9/1985 | European Pat. Off. | 248/179 |
| 1571903 | 7/1980 | United Kingdom | 343/765 |

Primary Examiner—William L. Sikes
Assistant Examiner—Michael C. Wimer
Attorney, Agent, or Firm—Oblon, Fisher, Spivak, McClelland & Maier

[57] ABSTRACT

An orienting and angular positioning device for the rotational axis of a rotatable load such as a dish antenna for the dynamic tracking of a non-stationary satellite is described. The antenna is supported on a support member which is rotatably mounted on one mounting plane of a wedge-shaped intermediate member which has two mounting planes which are inclined relative to one another at a predetermined angle A. The other mounting plane of the wedge is rotatably mounted to an inclined upper mounting plane of a fixed member. Releasable mechanisms are provided for holding the fixed member solidly connected with the support member and for holding the intermediate member solidly connected with the support member. A drive unit is fixed to the intermediate member and has a drive pinion engaged with a gear on the support member. When the fixed member and support member are held solidly connected with one another operation of the drive unit causes rotation of the wedge relative to both members to reorientate the rotational axis of the support member. The support member can be rotated about its axis by operation of the drive unit when the intermediate member is held solidly connected with the fixed member.

9 Claims, 6 Drawing Sheets

DEVICE FOR ORIENTING AND ANGULARLY POSITIONING THE AXIS OF ROTATION OF A ROTATABLE LOAD

BACKGROUND OF THE INVENTION

1. Field of the Invention

The present invention relates to a device for orienting and angularly positioning the axis of rotation of a rotatable load.

Such a device is appropriate to an apparatus including a periodically turned load, and which has appropriate drive means and sensing means for detecting the amount of rotation, and which needs the axis of rotation of the load to be orientated relative to an origin position. Applications for such a device occur in the fields of measuring and controlling instruments, machine tools, robotics, helix agitators, and various other orienting mechanisms, for example the positioning equipment of optical or radio-astronomy telescopes. There are, of course, many other applications for such a device.

For the purposes of illustration, prior art devices of this type and the device of the present invention will be described with reference to their application to the orienting and angular positioning of the axis of rotation of a radio frequency dish antenna intended, for example, for the dynamic tracking of a non-stationary satellite.

2. Description of the Prior Art

A typical prior art orienting and positioning device for use with such a dish antenna is illustrated in FIG. 1. The device includes a fixed member 3 which is generally constituted by a tower on which a load support member 2 termed the "azimuth assembly" is mounted. The upper part of this azimuth assembly 2 rotates about the vertical axis, and on this support member a sighting assembly 5 is fixed. The sighting assembly comprises a horizontal axle which allows articulation of an antenna support assembly 1 which is called the "antenna".

The movable plate of the azimuth assembly 2 together with the sighting assembly 5 and the antenna 1 represent a rotatable load. Rotation of this load with respect to the tower 3 is normally provided by a motor drive and is sensed by measuring means such as an angular coder or potentiometer. The azimuth assembly 2 is mounted on the tower 3 in a horizontal plane.

Such a device as described with respect to FIG. 1 therefore requires separate motor drives for driving the azimuth assembly 2 in rotation about a vertical axis and the sighting assembly 5 about a horizontal axis.

Another type of prior art orienting and positioning device is illustrated with respect to FIGS. 2 to 5. In this arrangement an additional intermediate member 4 is positioned between the tower 3 and the azimuth assembly 2. This intermediate member is termed a wedge in the following discussion. The wedge defines two mounting planes and at least one of these planes is inclined with reference to the horizontal plane. The wedge is mounted so that it can be rotated relative to each of the members to which it is adjacent.

An initial or position of origin is illustrated in FIG. 2 in which the wedge 4 is disposed so that the rotation axis of the azimuth assembly is aligned with a vertical reference axis of the tower. In the position illustrated in FIG. 4, the wedge is disposed so that the rotation axis of the azimuth assembly 2 is shifted by an angular amount B relative to the reference axis of the tower 3.

FIGS. 3 and 5 illustrate the effect of the normal use of such a wedge. Rotation of the wedge through 180° relative to its origin position as illustrated in FIG. 2 results in the rotation axis of the rotatable load 1, 2 and 5 being displaced by an angular value 2A relative to the reference axis of the tower, where A is the angle defined between the two mounting planes of the wedge. The position after such a 180° rotation is illustrated in FIG. 3. It will be noted that the rotation axis remains in its original vertical plane but has been shifted to one side only of the reference axis as shown in FIG. 3.

In the case where the rotation axis of the load 1,2,5 is shifted by an angular value B which is less than 2A with reference to the vertical reference axis of the tower 3, the new orientation of the rotation axis is sited out of the vertical plane containing the origin position and the 2A position and is shifted relative to that vertical plane by an angle equal to 2A-B, as illustrated in FIG. 5. The particular case in which the angle B is equal to the angle A produces two equal and opposite orientations with reference to the vertical plane of the tower 3 and the perpendicular vertical plane, each value equal to A.

Although the positions described are the most frequently used, it will be appreciated that any other setting of the wedge may be effected so that the two orientations for example would be situated in the same quadrant.

In all cases and for both useful positions, the articulation axes of the antenna 1 on the sighting assembly 5 are positioned in a common vertical plane.

A device of this type using a wedge with two relatively inclined mounting planes can be used with an azimuth assembly which is solidly connected with the tower 3.

A drive between the wedge 4 and the azimuth assembly 2 and the existence of a non-driven bearing on the inclined mounting plane between the wedge and the tower 3 allows for angular positioning of the load.

Although this device allows convenient adjustment of the angular orientation of the axis of the azimuth plate 2 by rotation of the wedge 4, it has the disadvantage of eliminating the relative rotation of these two elements and it is therefore necessary to use an additional rotating device to provide rotation of the antenna 1.

SUMMARY OF THE INVENTION

An object of the invention is to provide an orienting and angular positioning device of the type previously discussed in which a single drive means may be used for driving the load in rotation as well as for locating the axis of rotation.

The present invention accordingly provides a device for orienting and angularly positioning the axis of rotation of a rotatable load including a fixed member defining a reference axis, the fixed member having an upper mounting plane which is inclined at a non-zero predetermined angle to a plane perpendicular to said reference axis, a rotatable member adapted to support the load and defining said axis of rotation, the support member having a lower mounting plane perpendicular to said axis of rotation, an intermediate member defining a reference axis and having upper and lower mounting planes, the upper mounting plane of said intermediate member being perpendicular to its reference axis and the lower mounting plane of said intermediate member being inclined at said predetermined angle to said upper mounting plane, first mounting means between said upper mounting plane of said fixed member and said lower mounting plane of said intermediate member, which mounting means are capable of permitting relative rotation between said fixed member and said intermediate member, second mounting means between said upper mounting plane of said intermediate member and said lower mounting plane of said support member, which second mounting means are capable of permitting relative rotation between said intermediate member and said support member, means capable of driving said intermediate member and said fixed member in relative rotation, first releasable means operative to hold said support member solid with said fixed member, and second releasable means operative to hold said intermediate member solid with said fixed member.

With such a device operation of the first releasable means which holds the support member solid with the fixed member, allows the drive means to rotate the intermediate member or wedge relative to both the fixed and support members thereby adjusting the orientation of the rotational axis of the load. In a preferred embodiment this first releasable means comprises a band brake or a brake with flexible or rigid shoes. The band or shoe brake in a preferred embodiment is applied to an extension of the support member and is secured or pivoted to the fixed member.

When the second releasable means which holds the intermediate member solid with the fixed member is operated to hold said member so as to be solidly connected with one another the drive means effects rotation of the support member and therefore of the load about the oriented rotation axis. In this manner a single drive means can be used for both orienting and angular positioning of the load by selectively operating either one of the first and second releasable means and releasing the other.

A prior art device has already been described and an embodiment of the invention will now be described with reference to the accompanying diagrammatic drawings.

DESCRIPTION OF PREFERRED EMBODIMENTS

Figure 6:
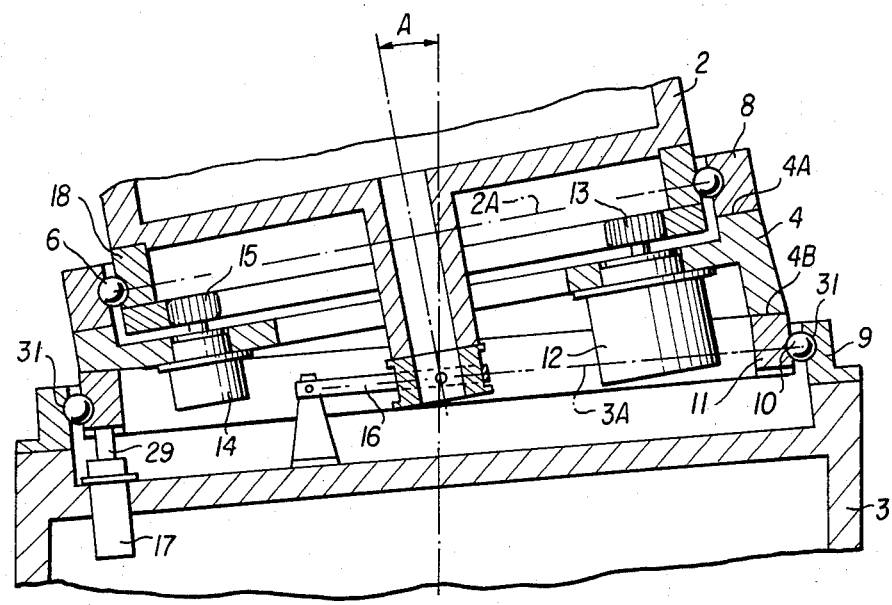
FIG. 6 is a longitudinal section showing the construction of an orienting and angular positioning device in accordance with an embodiment of the present invention, the members being shown in a position to produce the configuration of the antenna assembly illustrated in FIG. 3.

FIG. 6 illustrates the main components of an embodiment of the orienting and angular positioning device, the construction and operation of which will now be described.

Within an, change "has" to upper mounting plane of a fixed member or tower 3 is an outer cage 9 for a ball or roller bearing which provides mounting means between the fixed member 3 and a lower mounting plane position of a wedge-shaped intermediate member 4. The inner cage 11 of the mounting bearing is secured to the intermediate member 4 and the rollers or balls 10 are seated between the cages 9 and 11 to allow free rotation of the intermediate member 3 relative to the fixed member 4 in their common mounting plane. As shown, the upper mounting plane 3A of the tower or fixed member 3 is inclined at a predetermined angle A relative to a reference axis of the tower 3 which is vertical. The intermediate member 4 has upper and lower mounting planes 4A, 4B and is wedge-shaped and has an upper mounting plane which is inclined at the same predetermined angle A relative to the lower mounting plane of the intermediate member 4. The upper mounting plane 4A of the intermediate member 4 coincides with a lower mounting plane of a rotatable support member 2 which supports the load, in this case the antenna 1. The mounting means between the upper mounting plane of the intermediate member 4 and the lower mounting plane 2A of the support member 2 is an additional ball or roller bearing of which an outer cage 8 is secured to the intermediate member 4 and an inner cage 18 is secured to the support member 2 with an array of balls or rollers 6 seated inbetween the inner and outer cages so that free rotation can take place in the common mounting plane between the intermediate member 4 and the support member 2.

The bearings that form the mounting means between the fixed and intermediate members and the intermediate and support members may also be plain bearings. A bearing in which rollers are rotatably mounted in carriers fixed to one member and roll on a slide rigid with the other member may also be used.

An internally toothed ring gear 7 is secured to the support member 2 via the inner cage 18 of the mounting means. This ring gear 7 meshes with a pinion 13 connected to the output shaft of a drive unit 12 which is fixedly secured to the intermediate member 4. The drive unit 12 may include a motor, for example a hydraulic or electric motor and a gear reduction chain if necessary. The drive unit 12 may also be adapted to be manually driven. The engagement of the pinion 13 with the ring gear 7 allows the intermediate member 4 and the support member 2 to be driven in relative rotation. In an alternative arrangement, the drive unit could be fixedly secured to the support member 2 and have its pinion meshing with a ring gear constructed on the intermediate member 4.

A sensing unit 14 is also provided fixed to the intermediate member 4. The sensing unit includes a pinion 15 which meshes with the internally toothed ring gear 7 and has an output shaft connected into the unit to enable detection of and measurement of the amount of relative rotation between the support member 2 and the intermediate member 4. Any appropriate measuring system, such as a potentiometer type arrangement or angular coder may be used for measuring the rotation of the shaft of the pinion 15 as it is driven in rotation by the relative movement of the intermediate member 4 and the support member 2. The measuring carried out may be incremental or absolute. In an embodiment where the gear 7 is constructed on the intermediate member 4 instead of on the support member 2 the sensing unit 14 will be secured to the support member 2. A detent mechanism 29 is provided for releasably engaging for holding the intermediate member 4 so as to be selectively connected with the support member 3. The detent 29 is axially movable by an actuator 17 which allows it to be withdrawn from cooperation with a corresponding one of a plurality of conventional recess 31, 31 formed in the face of the cage 11 facing the fixed member 3. Recesses 31, 31 are formed in the lower face of the cage 11 at appropriate positions for each of the desired orientations. In the present example, two recesses 31, 31 are formed diametrically opposite each other so that the device can be used for orienting the rotation axis of the load selectively in the position illustrated in FIG. 6 or in a position of origin (FIG. 2) where the rotation axis is aligned with the reference axis of the tower 3.

Figure 3:
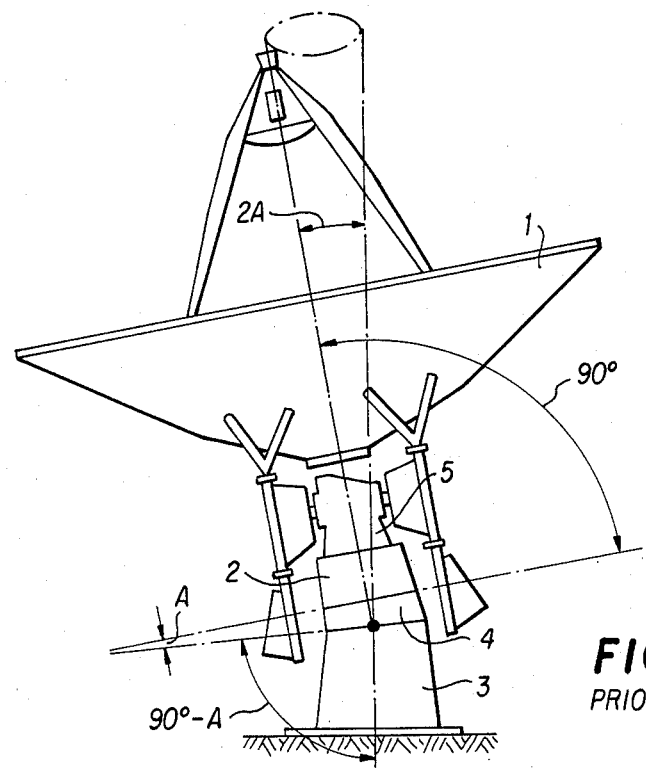
FIGS. 3 to 5 show the antenna assembly of FIG. 2 in respective different orientations.
Figure 4:
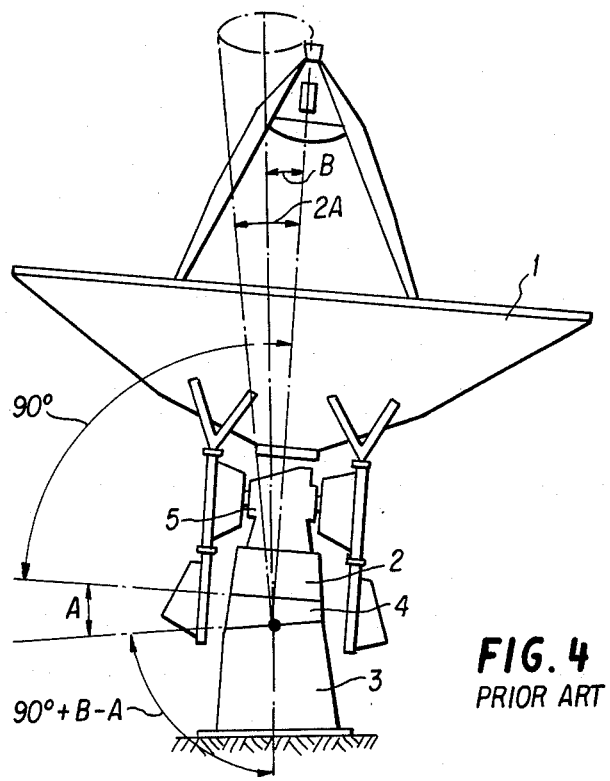
Figure 5:
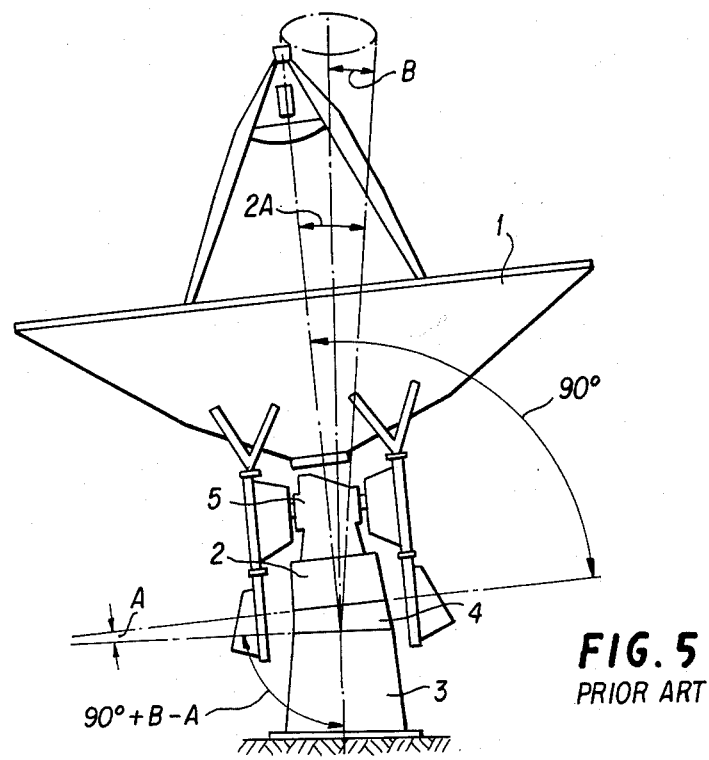
Figure 7:
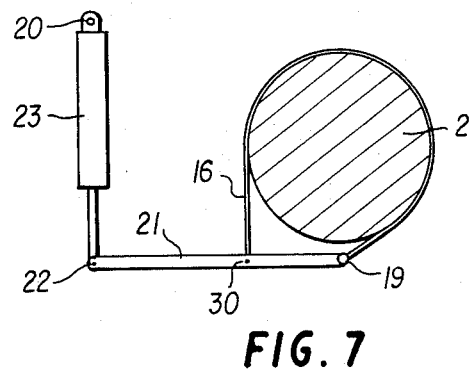
FIGS. 7 to 9 illustrate in plan view various braking arrangements for the first releasable means operative to hold the fixed member and the support member solid with one another for use in the device of FIG. 6.
Figure 8:
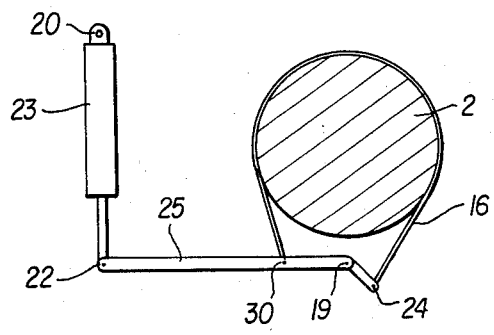
Figure 9:
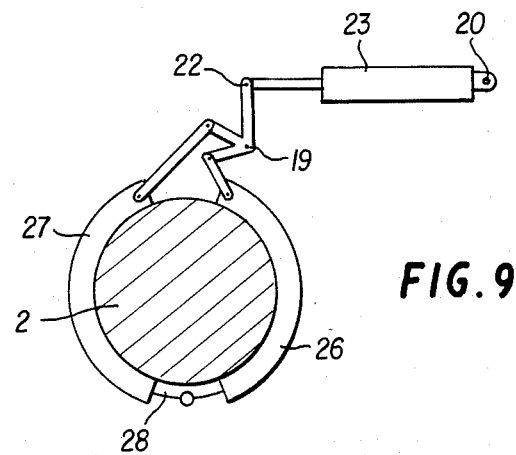

The support member 2 carries on its axis of rotation a cylindrical projection. A drum is formed on the end of the cylindrical projection and lies in the common mounting plane between the fixed member 3 and the intermediate member 4. A band 16 of a brake arrangement for stopping rotation of support member 2 is engaged around the drum and has its end fixed to a support secured on the fixed member 3. The location of this drum, which is represented in the plane of the ball race, is not limiting. The angle 2A, which is shown exaggerated in FIGS. 3 and 5 is in reality quite small, so taht it is not necessary for the brake band 16 to be completely perpendicular to the axis of the drum for correct operation. Deviation from the perpendicular can readily be taken up by the elasticity of the band and by use of a knee joint in the connection between the band 16 and its pivot support. Various constructions for the brake arrangement are illustrated in FIGS. 7 to 9, which show various mechanisms for operating the brake to hold the support member 2 and the fixed member 3 solid with one another and releasing the brake to allow relative rotation between these members. In the arrangement shown in FIG. 7, the brake band 16 is wrapped around the drum of the support member 2. One end of the band is secured to a pivot 19 solidly connected with the fixed member 3 and the other end is attached to a pivot point 30 disposed on a lever 21 which is itself pivoted at the pivot 19. An actuator 23 is articulated at one end on a pivot 20 solidly connected with the fixed member 3 and articulated at the other end to the axis of the extremity 22 of the lever 21. Operation of the actuator 23 pivots the lever 21 about the pivot 19 producing tension in the brake band 16 which is sufficient to hold the support member 2 solid with the fixed member 3 until the actuator 23 is released to reduce the tension in the band 16 and allow relative rotation between the support member 2 and fixed member 3.

In the modification illustrated in FIG. 8, the first end of the band 16 is not directly connected to the pivot 19 but to the angled end 24 of a knee lever 25 which has its knee joint connected to the pivot 19. The knee lever 25 replaces the straight lever 21 used in FIG. 7. The actuation and release of this arrangement is as described with respect to the arrangement of FIG. 7.

An alternative brake arrangement is shown in FIG. 9. In this arrangement brake shoes 26 and 27 joined by a flexible joint 28 surround the drum on the projection of the support member 2 and are tightened or released by operation of the cylinder actuator 23 which is connected to the ends of the shoes by means of a lever arrangement as illustrated. The jaws of the brake may either be flexible or rigid.

The braking arrangement could also be a pivotally mounted disc brake system.

The actuator for the brake can be operated manually, by an electro-mechanical device or by a hydraulic or pneumatic cylinder as illustrated.

In addition or in place of the braking arrangements illustrated, the means for holding the support member solid with the fixed member could include a detent and recess arrangement as described for the releasable holding means 17,29 for holding the fixed member solid with the intermediate member.

It will also be appreciated that the detent device described for holding the intermediate member solid with the fixed member could itself be replaced by a braking arrangement such as a band brake, a brake with jaws or a disc brake. Such braking arrangements could also be provided in addition to the detent described for this purpose.

Figure 10:
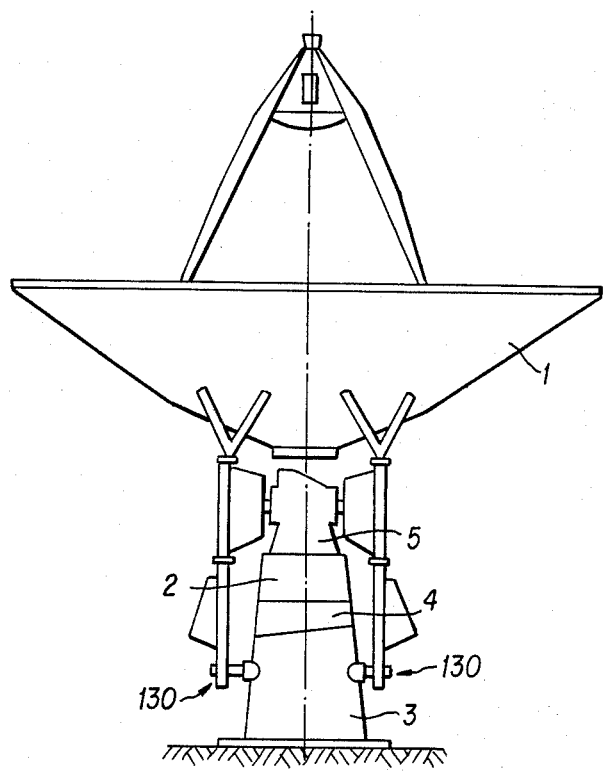
FIG. 10 shows a dish antenna with an alternative embodiment of the orienting device which uses an external locking mechanism for holding the movable support assembly solid with the tower.

FIG. 10 illustrates the use of an alternative or additional means for releasably holding the support member 2 solid with the fixed member 3 which takes the form of an external locking arrangement 130.

The operation of the device will now be described with reference to FIG. 6.

In the position illustrated in FIG. 6 the axis of rotation of the support member 2 is oriented at an angle 2A with respect to the position of origin where the axis of rotation is aligned with the vertical reference axis of the fixed member 3. In this position, the intermediate member 4 and the fixed member 3 of the base are connected by means of the detent 29 which is introduced into the recess in the cage 11. The brake band 16 is not held under tension so that the support member 2 can be rotationally displaced by means of the motor unit 12 since the pinion 13 engages with the internally toothed ring gear 7. Monitoring and measurement of this angular motion is carried out by means of the sensing unit 14.

In order to return the device from the position illustrated to its origin position, the brake actuator 23 is operated so that the support member 2 is held immobilized by the tension in the brake band 16 which holds this member 2 solidly connected with the fixed member 3. The detent 29 is withdrawn from its recess by means of the actuator 17 so that the intermediate member 4 is free to be rotationally displaced relative to both the fixed membe 3 and support member 2 by means of the motor drive unit 12. Since the gear 7 is held fixed, the reaction between the pinion 13 and the gear 7 causes the intermediate member 4 to be driven in rotation. Once the sensing unit 14 has measured a rotation through 180° the detent 29 is introduced into the opposite recess in the cage 11 corresponding to this new position and the tension in the brake band 16 is released so that the support member 2 can once again be rotated by means of the motor unit 12.

Figure 1:
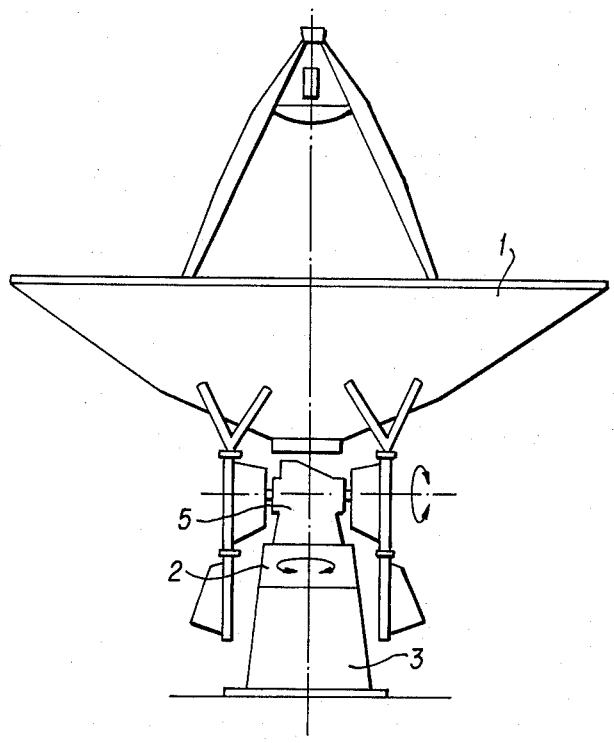
FIG. 1 shows a dish antenna with a first prior art type of orienting and angular positioning device.
Figure 2:
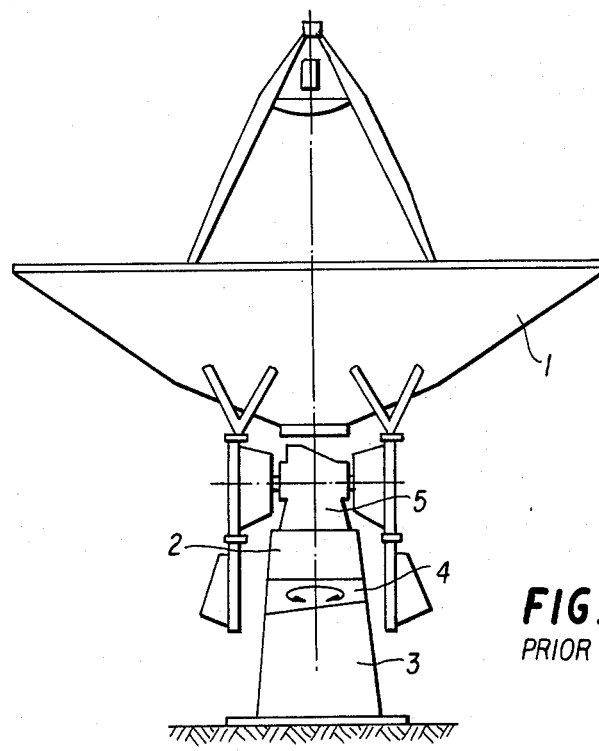
FIG. 2 shows a second embodiment of a dish antenna with a second type of orienting and angular positioning device shown in an origin position in which the rotational axis of the antenna is coincident with the vertical axis of the tower.

The position of origin illustrated in FIG. 2 is obtained if the inclinations with respect to the horizontal of the respective mounting planes of the intermediate member and of the fixed member are equal and each of angular value A so as to off set one another.

The arrangement can be returned from the position of origin to the position illustrated in FIG. 6 by holding the members 2 and 3 solidly connected with one another while the members 4 and 3 are released, and then driving the member 4 through 180° relative to the member 3 by means of the motor drive unit 12. The members 4 and 3 are then once again connected by the detent mechanism and the brake between the members 2 and 3 is released.

It will be appreciated that by rotating the intermediate member by less than 180° the rotational axis of the support member can be caused to be inclined at any angle between 0° and 2A relative to the vertical axis. In this case, however, the rotational axis will not lie in the same vertical plane as it does in the position of origin and in the position illustrated in FIG. 6. This disadvantage can, however, be corrected by resetting on site the antenna 1 as a function of the rotational angle of the intermediate member 4 to bring the rotational axis back into the same vertical plane.

Although the orienting device has been described with respect to the orienting of the rotational axis of a dish antenna for dynamic tracking of a non-stationary satellite, it will be appreciated that it can also be used in any other system where the rotational axis of a rotatable load has to be periodically re-oriented.

I claim:

1. A device for orienting and angularly positioning the axis of rotation of a rotatable load, comprising:
    a fixed member defining a first vertical reference axis, the fixed member having an upper mounting plane which is inclined at a non-zero predetermined angle to a plane substantially perpendicular to said first vertical reference axis,
    a rotatable support member adapted to support the load and defining said axis of rotation, the support member having a lower mounting plane substantially perpendicular to said axis of rotation,
    an intermediate member having upper and lower mounting planes, the upper mounting plane of said intermediate member being inclined at said predetermined angle with respect to said lower mounting plane of said intermediate member,
    first mounting means located between said upper mounting plane of said fixed member and said lower mounting plane of said intermediate member, which first mounting means includes means for permitting relative rotation between said fixed member and said intermediate member,
    second mounting means located between said upper mounting plane of said intermediate member and said lower mounting plane of said support member, which second mounting means includes means for permitting relative rotation between said intermediate member and said support member,
    drive means mounted on said intermediate member for rotatably driving said intermediate member relative to said fixed member,
    means interconnecting said support member and said fixed member for stopping rotation of said support member with respect to said fixed member, and
    means for holding said intermediate member with said fixed member.

2. A device according to claim 1, further including sensing means connected to said intermediate member and said support member for measuring the amount of relative rotation therebetween.

3. A device according to claim 1, one of wherein the first and second mounting means includes a plurality of bearings.

4. A device according to claim 1, wherein said drive means includes a motor unit and a pinion connected to said motor unit in order to be driven in rotation thereby, and a gear wheel meshing with said pinion, the motor unit being rigid with one of said intermediate member and said support member, and the gear wheel being rigid with the other of said intermediate member and said support member.

5. A device according to claim 1, wherein said means for stopping rotation of said support member includes a drum connected to said support member, and a brake arrangement for engaging said drum and which is secured to said fixed member.

6. A device according to claim 1, in which one of the means for stopping rotation and means for holding includes a detent member.

7. A device according to claim 1, wherein the means for stopping rotation includes a locking mechanism.

8. A device according to claim 1, wherein one of the means for stopping rotation and means for holding comprises a disc brake.

9. A device according to claim 1, wherein said means for stopping rotation of said support member includes an actuator.

* * * * *